(No Model.)
T. DAVID.
GRAPPLING HOOK.
No. 605,221.   Patented June 7, 1898.
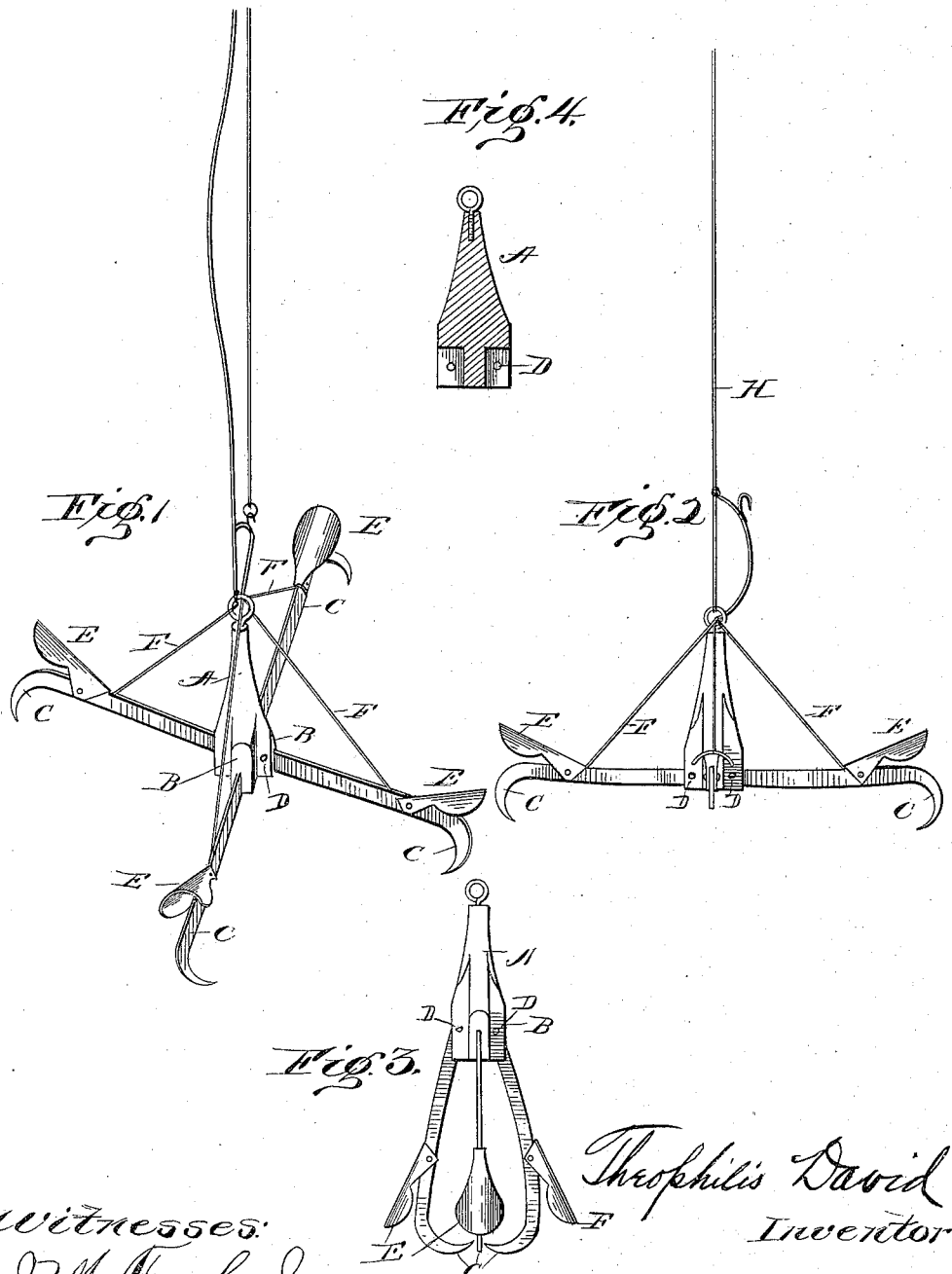

UNITED STATES PATENT OFFICE.

THEOPHILIS DAVID, OF CORUNNA, CANADA.

GRAPPLING-HOOK.

SPECIFICATION forming part of Letters Patent No. 605,221, dated June 7, 1898.

Application filed February 15, 1897. Serial No. 623,533. (No model.)

*To all whom it may concern:*

Be it known that I, THEOPHILIS DAVID, a citizen of the Dominion of Canada, residing at Corunna, in the county of Lambton and Province of Ontario, Canada, have invented certain new and useful Improvements in Grappling-Hooks; and I do hereby declare the following to be a full, clear, and exact description of the invention, such as will enable others skilled in the art to which it appertains to make and use the same.

This invention consists in a construction and arrangement of parts to form a grapple, substantially as set forth hereinafter and as illustrated in the accompanying drawings, in which—

Figures 1 and 2 show the grapple open. Fig. 3 shows the same closed. Fig. 4 shows the sinker-head.

The head A is provided with a ring at the top end to attach a rope H. It has four or other suitable number of ribs B projecting from its sides at the lower end. Each of these ribs is slotted to receive a grappling-hook arm C, which is held by a pivot-bolt D so as to turn freely out and in while held rigidly sidewise by the walls of the slot. The hooks C have suitable points at their lower or free ends.

On each hook C is pivoted a part E just above and outside of its bend, as shown, and these parts E are arranged to spread, so as in descending in water to tend to draw the hooks outward and open them, as in Fig. 2.

When the hooks are drawn up by pulling upon the rope H, they tend to draw together and catch their points C into anything in their way, the resistance of which would help to cause them to catch into and hold it if of suitable material or substance.

To each hook C is attached a cord F, which being united into one enables all the hooks to be drawn out to open the grapple independent of the use of the spreading parts E in use, as in Fig. 1.

Various modifications may be made.

I claim—

1. In a grapple, the combination of a head, hooks pivoted to said head, at angles to each other, and having pivoted spreaders, and means adapted to spread said hooks, substantially as set forth.

2. In a grapple, the combination of a head, hooks pivoted to said head, at angles to each other, and having pivoted spreaders and spreading cords or lines adapted to spread said hooks, substantially as set forth.

In testimony whereof I affix my signature in presence of two witnesses.

THEOPHILIS DAVID.

Witnesses:
 JNO. M. GLEASON,
 H. J. BREEZE.